United States Patent [19]
Tozawa

[11] Patent Number: 5,701,848
[45] Date of Patent: Dec. 30, 1997

[54] ADJUSTABLE ANIMAL LEASH PROVIDED WITH PLURAL BRANCH LEASH MEMBERS

[76] Inventor: Masashi Tozawa, 55-25, Satanakamachi 6-chome, Moriguchi-shi, Osaka, Japan

[21] Appl. No.: 547,762

[22] Filed: Oct. 24, 1995

[30] Foreign Application Priority Data

Sep. 18, 1995 [JP] Japan .................... 7-238068

[51] Int. Cl.$^6$ .................................... A01K 27/00
[52] U.S. Cl. ............................. 119/797; 119/795
[58] Field of Search .......................... 119/797, 770, 119/771, 792, 793, 795, 905, 907; D30/153; 294/170, 157, 146

[56] References Cited

U.S. PATENT DOCUMENTS

| | | | |
|---|---|---|---|
| 3,441,005 | 4/1969 | Fink | 119/798 |
| 4,060,056 | 11/1977 | Maietta | 119/907 |
| 4,892,063 | 1/1990 | Garrigan | 119/109 |
| 4,964,369 | 10/1990 | Sporn | 119/907 |
| 5,483,925 | 1/1996 | Childress | 119/795 |
| 5,511,515 | 4/1996 | Brown et al. | 119/792 |

*Primary Examiner*—Todd E. Manahan
*Attorney, Agent, or Firm*—Burns, Doane, Swecker & Mathis, LLP

[57] ABSTRACT

A pair of branch leash members bifurcated at distal end of a main leash member are adjacently passed through a hollow cylindrical adjuster which can be slidably moved along the branch leash members and placed anywhere thereon, where the adjuster prevents the branch leash members from being pulled apart over the placed position by having an inclined end facet, so that the length of the branch leash members can be variably adjusted, permitting selective use of the leash member.

3 Claims, 4 Drawing Sheets

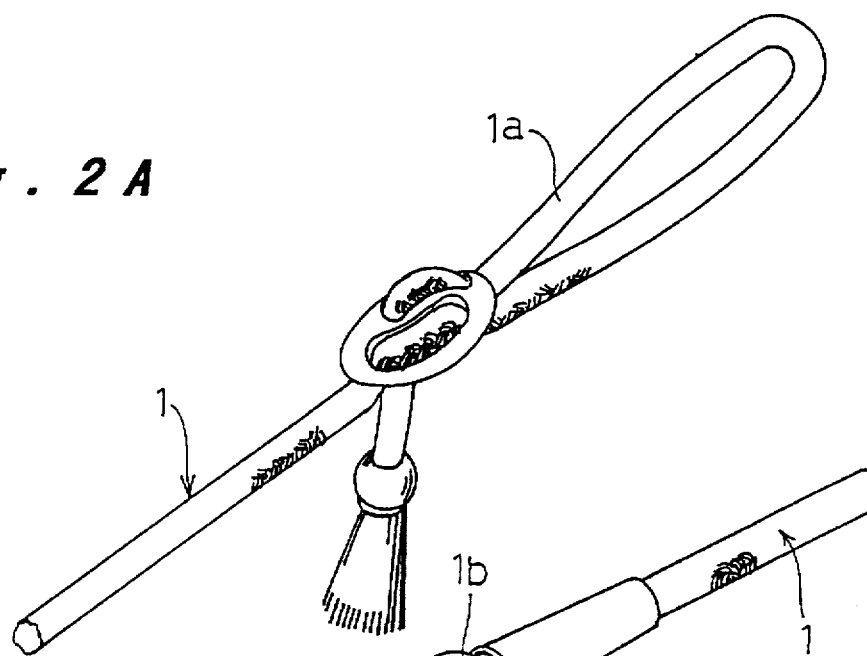
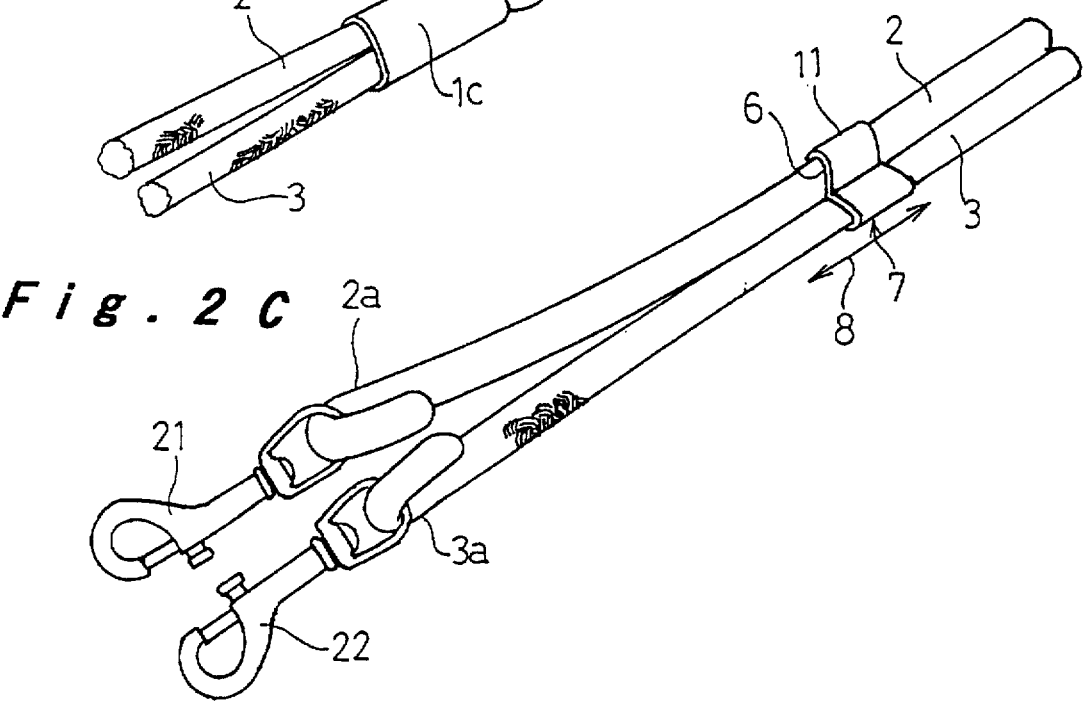

ADJUSTABLE ANIMAL LEASH PROVIDED WITH PLURAL BRANCH LEASH MEMBERS

BACKGROUND OF THE INVENTION

1. Technical Field of the Invention

The present invention relates to a leash for walking animals such as dogs, and more particularly to a leash provided with a pair of branch leash members bifurcating at the distal end thereof, respectively attached to animals. This configuration allows for control of two or more animals.

2. Description of the Related Art

For walking two or more dogs, a multitude of similar length leashes has usually been employed, each leash being attached to each dog. These leashes allow the dogs to move individually and unrestrictedly about the walker within the limit of the length of the leashes, which means a plurality of dogs can move in various directions and pull the walker with various forces, swaying the proximal end in all directions. It is, therefore, difficult to control the dogs freely because of said swaying movement and because the walker cannot restrict the position of the dogs relative to the walker to a certain desired direction.

There have been known prior art arrangements such as shown in FIG. 1 which solve the aforementioned problems. A leash member (a) is provided at the distal end with a ring (b) made of metal, a pair of branch leash members (c)(d) bifurcating therefrom, with each distal end being individually attached to harnesses (f) or collars (not shown) on each of the two dogs (e).

When a person walks two dogs (e) holding the proximal end of the leash member (a), the pulling force exerted on the leash member (a) by the person is concentrated on the ring (b), which works as a compass point and from which the force is applied on each of the two dogs (e) attached to each of the two branch leash members (c)(d).

This configuration enables the walker to restrict the direction of two dogs (e) approximately to the distal end of the main leash member (a). The range in which the dogs move about is also restricted within the limit of the length of the branch leash members (c)(d) which is much shorter than that of the whole leash member. Moreover, even though each dog moves in various directions with various forces, all these forces are concentrated on the ring (b) which works as a compass point, and thus the leash member (a) may be slightly swayed at the distal end but not largely at the proximal end. Consequently, the walker can control both dogs (e) freely without being swayed by unrestricted movements of two dogs (e).

On the contrary, the length of branch leash members (c)(d) is fixed in the above-described prior art arrangement, which means that the leash members (c)(d) can be either too short or too long according to the size of each dog (e). If the branch leash members are too long, it becomes difficult to control both dogs comfortably, as each dog (e) can move about as it likes. Whereas if the branch leash members are too short, both of the dogs (e) are forced to walk too near each other, being unwillingly contiguous or colliding unexpectedly, which can lead to stress or disharmony between the dogs. This problem can be solved by employing various lengths of branch leash members (c)(d) according to the size of animals. However, this necessitates the manufacture of too many kinds of leashes which will be complicated and cost a lot.

Another disadvantage of the known prior art arrangement is that it does not permit selective use according to the change of situation, such as when the walker wants to control the dogs within a very small range because of heavy traffic, or on the contrary when the walker wants to allow the dogs to move freely within a wider range.

SUMMARY OF THE INVENTION

An object of this invention is to provide a leash for two or more animals, the length of which can be freely adjusted.

These and other objects and features of the present invention will become more apparent from the following description taken in conjunction with the accompanying drawings which illustrate specific embodiments of the invention.

BRIEF DESCRIPTION OF THE DRAWINGS

FIG. 2 (a)–(c) are perspective views of each portion of the present invention showing an embodiment.

FIG. 3 (b) is a transverse section top view of the adjuster of the present invention; and FIG. 3 (c) is a perspective view of the adjuster of the present invention.

DESCRIPTION OF THE PREFERRED EMBODIMENT

Figure 4:
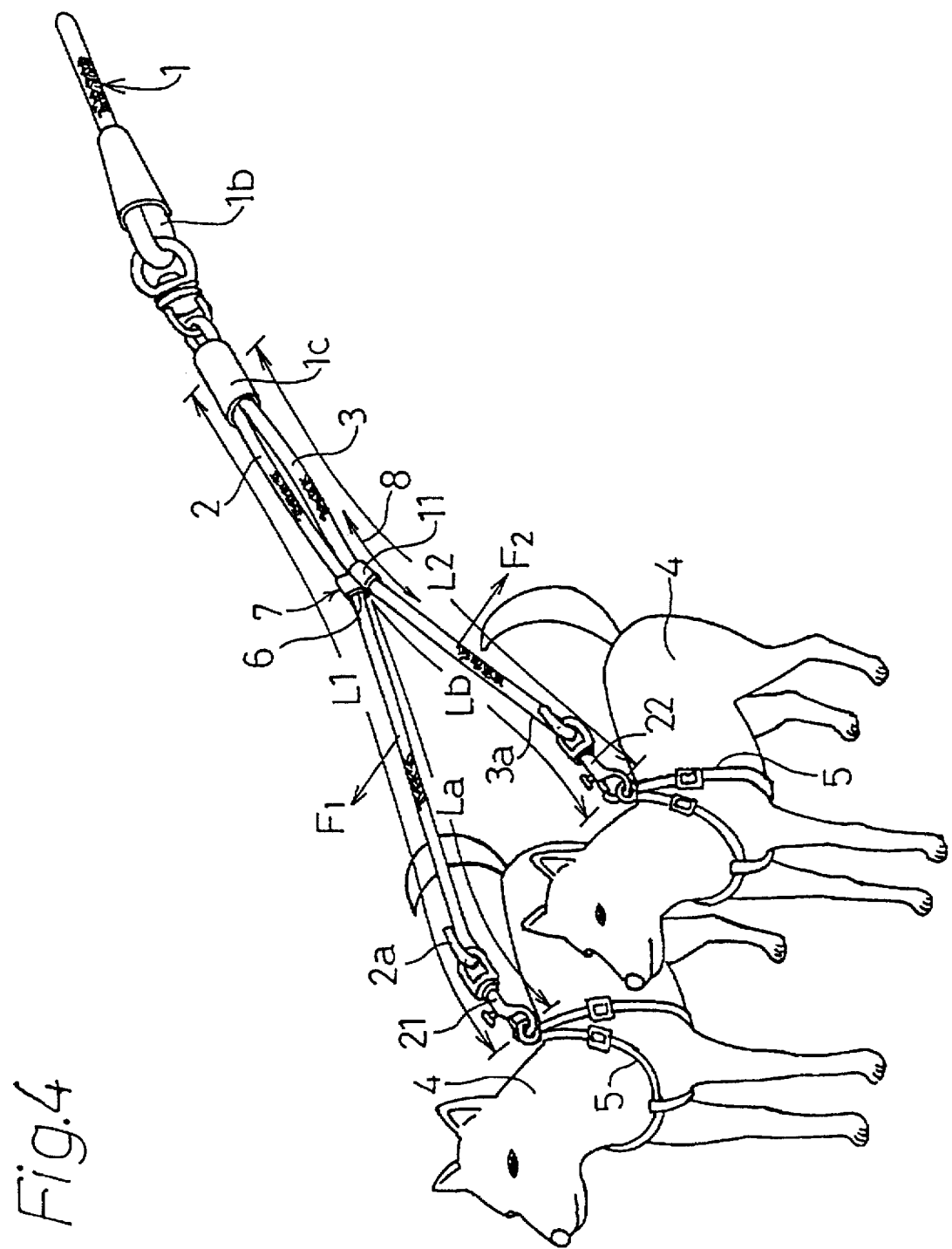
FIG. 4 is a perspective view of the present invention showing an embodiment for walking two animals.

Referring to FIG. 4 in detail, an animal leash of this embodiment consists of one main leash member 1 and a pair of branch leash members 2, 3 parting from a bifurcating point 1c disposed adjacent the distal end 1b of the main leash member 1. Fastener means 21, 22 are provided at each distal end 2a, 2b of the branch leash members 2, 3, attached to harnesses 5 or collars (not shown) of animals such as dogs 4. This configuration can be seen in the prior art as mentioned above, having similar advantages when controlling two animals.

Figure 1:
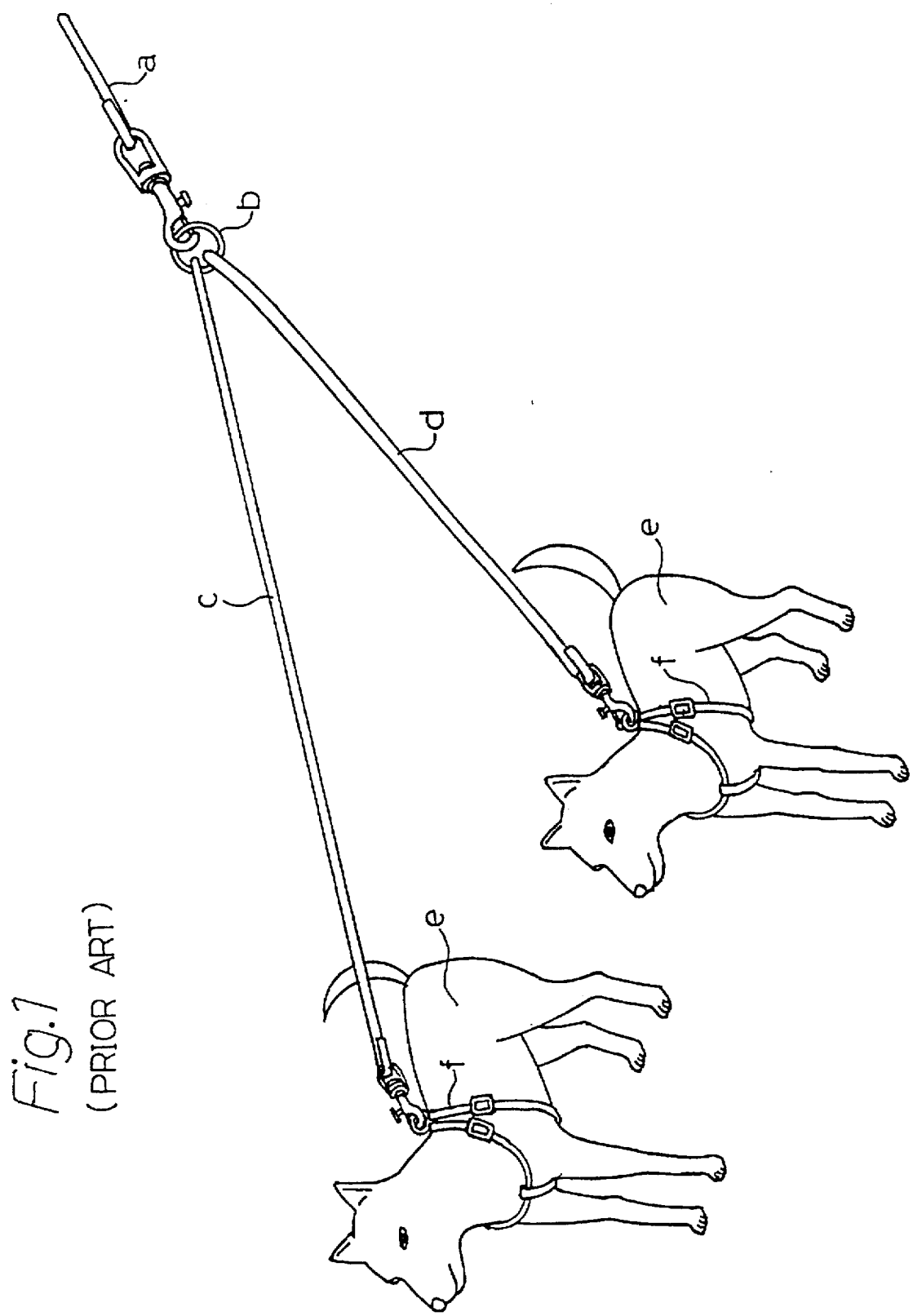
FIG. 1 is a perspective view of a conventional leash for walking two animals.
Figure 3A:
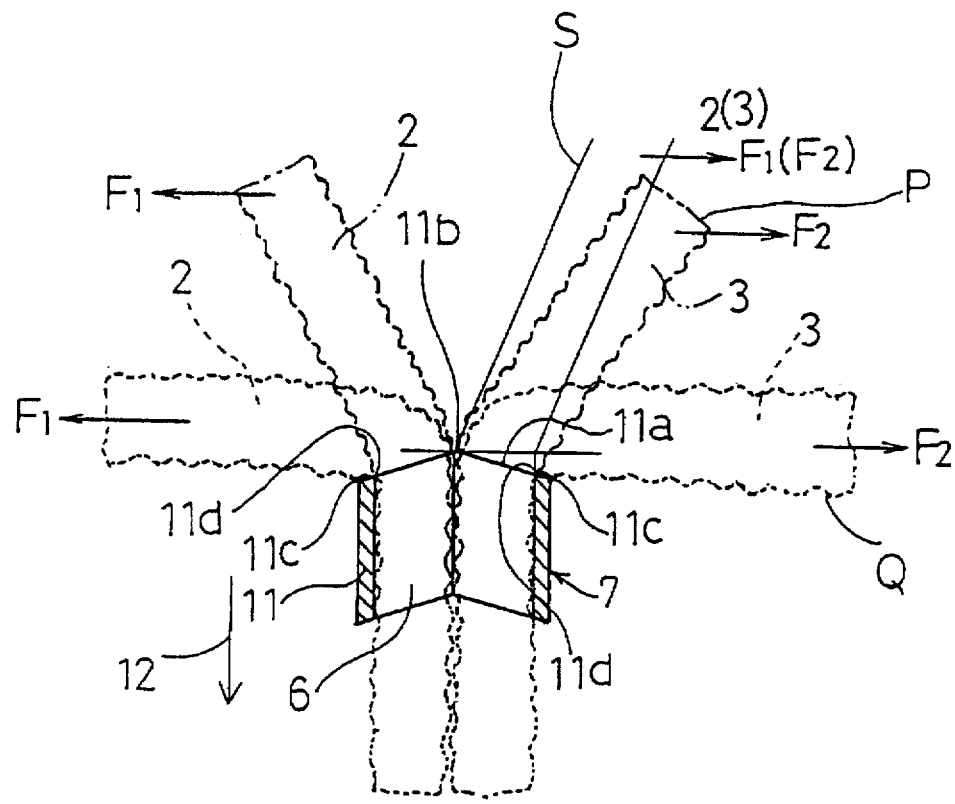
FIG. 3 (a) is a longitudinal section front view of the adjuster of the present invention.
Figure 3B:
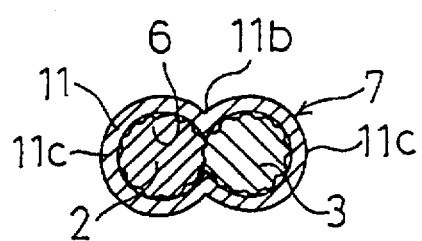
Figure 3C:
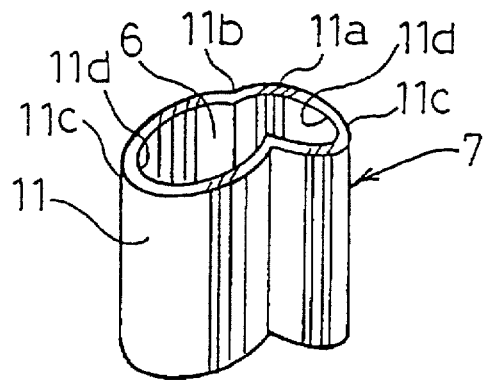

A feature of the present invention is the provision in a leash, of a hollow cylindrical adjuster 7 having a passage 6, through which both branch leash members 2, 3 adjacently pass as shown in FIG. 2 (c) and FIGS. 3 (a) to (c). The adjuster is slidable along the contiguous leash members 2, 3 and prevents both branch leash members 2, 3 at any placed position from being pulled apart by forces exerted thereon from each distal end 2a, 3a.

The adjuster 7 is slidably moved along the contiguous branch leash members 2, 3 which pass through a passage 6 of the adjuster 7, and can be placed at any position however far from the bifurcating point 1c. The adjuster 7 prevents both branch leash members 2, 3 from being pulled apart by forces exerted thereon from each distal end 2a, 3a at any placed position. Accordingly, if dogs 4 attached to each distal end 2a, 3a of each branch leash member 2, 3 move individually in opposite directions relative to each other and the forces F1, F2 are exerted on the adjuster 7 as shown in FIG. 3 (a) and FIG. 4, the adjuster 7 receives the forces so that the branch leash members 2, 3 are not pulled apart toward the bifurcating point 1c.

Therefore, although the length L1, L2 of each branch leash member 2, 3 is fixed, the actual length (La) (Lb) when used in the bifurcated state can be variably set by slidably adjusting the adjuster 7 in directions indicated by an arrow 8 in FIG. 2 (c) and FIG. 4 along the contiguous branch leash members 2, 3.

An advantage of the present invention is the adaptability of its length according to the size of the dogs 4, circumstances, and the desired state of walking by freely adjusting the length of a pair of branch leash members 2, 3. Another advantage of the present invention is much lower cost as compared to manufacturing various lengths of leashes according to the size of the dogs 4.

The adjuster 7 is a cylindrical member 11, its passage 6 having a gourd-like cross-sectional view, as the two branch leash members 2, 3 adjacently and tightly pass therethrough, as shown in FIGS. 3 (a) to (c). The distal end of the cylindrical member 11 is peaked at its axis 11b, which gives anticlinal slopes to an end facet 11a. A rim 11d of the end facet 11a having such slopes forms a curved line, slanting from the axis 11b of the adjuster 7 toward both sides 11c. When the distal parts of the branch leash members 2, 3 are pulled from the distal ends in opposite directions and the pulling forces F1, F2 are exerted on the adjuster 7 through a process indicated by broken lines (P) in FIG. 3 (a), the adjuster 7, having the above-described rim, lets the branch leash members 2, 3 bend until they make right angles as indicated by dotted lines (Q) in FIG. 3 (a).

If the end facet 11a of the cylindrical member 11 is flat and the rim 11d has no downward slants, the pulling forces F1, F2 from the branch leash members 2, 3 act on the end facet of the cylindrical member 11 even at a gentle angle as indicated by fine lines (S) in FIG. 3 (a), inducing a component force which lets the cylindrical member slide along the contiguous branch leash members 2, 3 in the direction indicated by an arrow 12 in FIG. 3 (a).

Because of the slopes given to the end facet 11a and the rim 11d slanting toward both sides 11c, the adjuster 7 is not influenced by the pulling forces F1, F2 until the branch leash members 2, 3 are bent to form a horizontal line as shown by dotted lines (Q) in FIG. 3 (a). When the pulling forces F1, F2 act on the adjuster at right angles, no component force is induced to push the adjuster in the direction of the arrow 12 along the leash members 2, 3. At the same time, the rim 11d of the end facet 11a catches the right-angledly bent corners of each branch leash member 2, 3, keeping the adjuster from slipping. Consequently, the adjuster 7 unfailingly prevents the branch leash members 2, 3 from being pulled apart over the position of the adjuster 7.

As a result, the adjuster 7 assuringly keeps the length (La)(Lb) of the branch leash members 2, 3 from being unexpectedly changed by forces exerted by animals of any size and strength.

The branch leash members 2, 3 are made of braided cords having a coarse surface, which strengthens the catch with the rim 11d, and thus increases the stability of the length (La)(Lb) in use set by the adjuster 7. A cross sectional view of the branch leash members 2, 3 is round-shaped as shown in FIG. 3 (b), and the contact surface between the cylindrical member 11 of the adjuster 7 and both leash members 2, 3 occupies approximately three quarters of the circumference of the leash members 2, 3, which helps the cylindrical member 11 tightly catch hold of each leash member 2, 3. Such configuration also facilitates the passage 6 to hold the branch leash members 2, 3 tightly and rectilinearly therein without being influenced by the movement of the leash members 2, 3 being pulled apart. Accordingly, when the branch leash members 2, 3 are pulled apart to form a horizontal line, sharp folds are formed in the right-angled corners, which augments the capacity of preventing the cylindrical member 11 from slipping, with the rim 11d catching the leash members 2, 3, promising that the length (La)(Lb) of the branch leash members 2, 3 set by the adjuster 7 is not unexpectedly changed.

In an alternative embodiment, a pair of leash members arranged closely adjacent which can be substantially used as a single leash may be also employed. In that case the main leash member 1 and the branch leash members 2, 3 will be identical, being bound at the bifurcating point 1c.

The passage 6 of the cylindrical member 7 can be divided to form individually two passes for each of the two branch leash members 2, 3, provided that the leash members 2, 3 are not greatly distant from each other. The present invention does not require any particular structure for the bifurcating point 1c, and allows for other structures such as a ring.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An animal leash comprising:

a leash member including a main leash member and a pair of branch leash members bifurcating at a distal end of said main leash member;

a hollow cylindrical adjuster through which both of said branch leash members adjacently pass, said adjuster being slidable along said branch leash members and having an end facet at a distal end which prevents said branch leash members from being pulled apart from distal ends of said branch leash members, said adjuster being a cylindrical member, a passage of which has a cross-sectional configuration such that both of said branch leash members adjacently pass through said passage, the end facet of said adjuster inclining from an axis where both of said branch leash members are closely attached toward both sides of said adjuster.

2. The animal leash as defined in claim 1, wherein each of said branch leash members possesses a round cross-sectional shape.

3. The animal leash as defined in claim 2, wherein each of said branch leash member is made of braided cords.

* * * * *